UNITED STATES PATENT OFFICE.

CHARLES WOOD, OF TEES IRON WORKS, MIDDLESBOROUGH-ON-TEES, ENGLAND.

IMPROVEMENT IN THE MANUFACTURE OF IRON AND STEEL FROM GRANULATED IRON.

Specification forming part of Letters Patent No. 144,009, dated October 28, 1873; application filed September 13, 1873.

*To all whom it may concern:*

Be it known that I, CHARLES WOOD, of the Tees Iron Works, Middlesborough-on-Tees, in the county of York, England, a subject of the Queen of Great Britain, have invented or discovered new and useful Improvements in the Manufacture of Wrought Iron and Steel; and I, the said CHARLES WOOD, do hereby declare the nature of the said invention, and in what manner the same is to be performed, to be particularly described and ascertained in and by the following statement thereof—that is to say:

This invention has for its object improvements in the manufacture of wrought iron and steel.

Rotating puddling-furnaces are now well known, and are in common use. These furnaces have been worked in two ways. Sometimes the iron to be puddled is put into the furnace in the form of pigs, and at other times the metal is melted in a separate furnace, and then run into the rotating puddling-furnace.

There are disadvantages attendant on both these methods of working. When pig-iron is charged into the rotary furnace damage is almost necessarily done to the linings of the furnace, and much time and fuel are wasted in melting. On the other hand, if melted iron be run into the furnace it is found that the yield of metal is decreased, less metal being reduced out of the fettling, and the quality of the produce is not so good as when the metal is puddled from the cold pig.

Now, according to my invention, I avoid these disadvantages by charging the rotary furnace with the metal in the state of granules. When this is done the furnace can be rotated immediately after receiving the charge, by which means the temperature is kept uniform all round the furnace, and every portion of the metal is, in succession, brought into contact with the lining by the rolling of the heap of granules over and over within the furnace, an operation which facilitates the taking up of the metal from the lining, and at the same time causes the granules very rapidly to take up the heat of the furnace, while, at the same time, also, every particle of metal is in turn exposed to the action of the flame.

It is not necessary that the metal should be finely granulated; it works well in granules of the size of marbles.

Any efficient rotary puddling-furnace, such as Danks' or Crampton's, may be employed. The puddling operation is, in other respects, conducted in the ordinary manner, so as to produce wrought-iron or the steely description of iron known as puddled steel.

I am aware that shot-iron has been puddled in an ordinary puddling-furnace with a stationary hearth; but in such case the granules at the bottom are exposed to flame by stirring the mass, or by raising the bottom granules through the others; whereas, when granulated iron is treated in a rotary furnace, all the granules of the charge are caused to rotate consecutively, so as to change their relative positions by a rolling movement, and to be exposed alternately and successively to the action of the flame and the oxidizing action of the lining of the furnace. Therefore I do not claim, broadly, the puddling of granulated iron in every way; but

What I claim as my invention is—

The improvement in the art of puddling granulated iron, consisting in causing the granules to rotate consecutively while exposed to flame, substantially as before set forth.

CHARLES WOOD.

Witnesses:
G. F. WARREN,
JOS. LAKE,
*Both of No. 17 Gracechurch street, London.*